March 10, 1931.  W. J. O'CONNOR  1,795,964
NONFREEZING WINDSHIELD WIPER
Filed Oct. 19, 1928

W. J. O'Connor
INVENTOR

BY Victor J. Evans
ATTORNEY

Patented Mar. 10, 1931

1,795,964

UNITED STATES PATENT OFFICE

WALTER J. O'CONNOR, OF PITTSBURGH, PENNSYLVANIA

NONFREEZING WINDSHIELD WIPER

Application filed October 19, 1928. Serial No. 313,523.

This invention relates to improvements in windshield or window wipers, the general object of the invention being to provide means whereby a non-freezing solution, such as glycerine or the like can be fed through the edge of the wiper strip which contacts the transparent member so that some of this solution will be applied to the member which acts to prevent water or moisture from adhering to the transparent member and also acts to prevent snow or ice collecting thereon.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1:
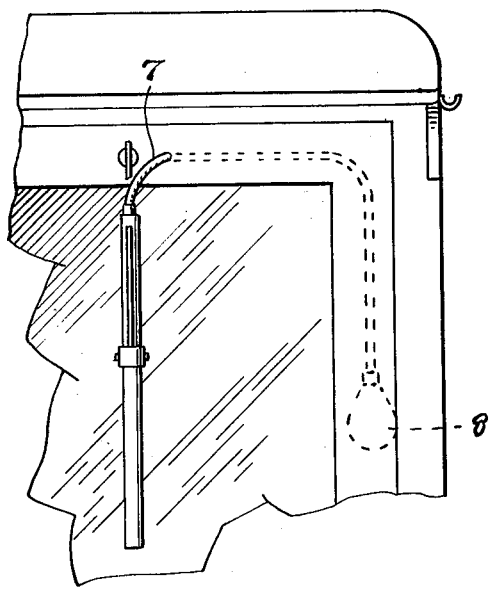
Figure 1 is a view showing the invention in use on the windshield of a motor vehicle.
Figure 2:
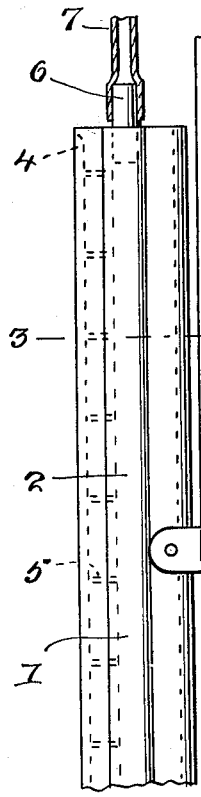
Figure 2 is a side view of the improved wiper.
Figure 3:
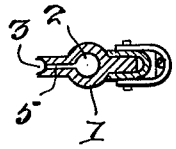
Figure 3 is a section on line 3—3 of Figure 2.

As shown in these views, I form the wiper strip 1 with a longitudinally extending bore 2 which may be a tube placed in the wiper. The contacting edge of the wiper strip is formed with a groove 3, the ends of which are closed, as shown at 4 in Figure 2, and small passages 5 extend from the bore into the bottom of the groove so that liquid placed in the bore will pass through these passages into the groove 3 and thus be deposited upon the surface of the windshield or other transparent member with which the wiper engages.

A nipple 6 extends into the top part of the bore and a tube 7 has one end connected with the nipple and said tube passes through a hole in the windshield frame and has a bulb 8 connected with its other end so that when glycerine or the like is placed in this bulb, a slight squeeze on the bulb will force some of the liquid through the tube 7 into the bore and from the bore, the liquid will pass through the passages 5 into the groove 3 and thus be deposited upon the outer surface of the windshield.

Figure 4:
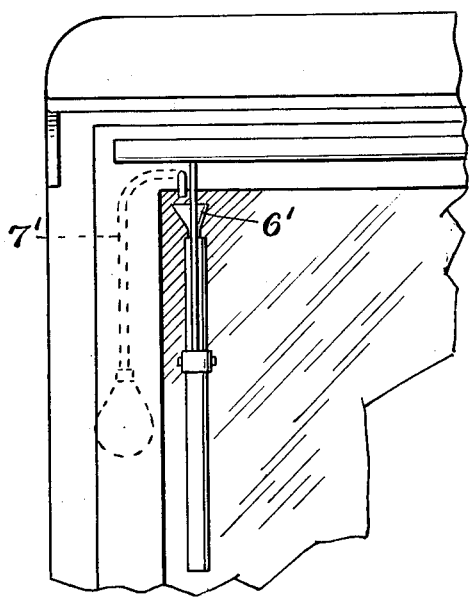
Figure 4 is a view similar to Figure 1, but showing the invention in use in connection with a wiper which moves back and forth over the entire windshield.
Figure 5:
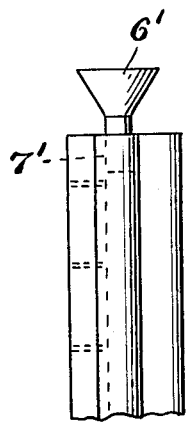
Figure 5 is a detail view of this form of the invention.

Figures 4 and 5 show the invention used with a windshield wiper which travels back and forth over the entire length of the windshield and in this case, a funnel-like member 6' is used instead of the nipple, and the discharge end of the tube 7' is so arranged that it will discharge into the funnel-shaped member when the wiper is at one end of its stroke so that when the wiper is in this position, a certain amount of the liquid can be forced into the funnel-shaped member to fill the bore and then during the movement of the wiper, this liquid will pass through the passages into the groove under the action of gravity.

From the foregiong it will be seen that I have provided simple means whereby an anti-freeze solution is applied to the windshield or other transparent surface by the wiper itself.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A wiper of the class described comprising a flexible wiper strip formed of a single piece of rubber and having a groove in its wiping edge, a longitudinally extending bore in the strip and passage connecting the bore with the groove and means for introducing an anti-freeze liquid into the bore.

In testimony whereof I affix my signature.

WALTER J. O'CONNOR.